United States Patent
Sun et al.

(10) Patent No.: US 9,176,592 B2
(45) Date of Patent: Nov. 3, 2015

(54) SYSTEM FOR, AND METHOD OF, CONFIGURING ELECTRO-OPTICAL READER AS A KEYBOARD DEVICE HAVING A SELECTED KEYBOARD LAYOUT

(71) Applicant: Symbol Technologies, Inc., Schaumburg, IL (US)

(72) Inventors: Yu Sun, Stony Brook, NY (US); John P. Evans, Levittown, NY (US); Dayou Wang, Mount Sinai, NY (US); Ke Zhang, Yaphank, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 219 days.

(21) Appl. No.: 13/688,643

(22) Filed: Nov. 29, 2012

(65) Prior Publication Data
US 2014/0144978 A1    May 29, 2014

(51) Int. Cl.
*G06F 17/00* (2006.01)
*G06F 3/02* (2006.01)
*G06K 7/10* (2006.01)

(52) U.S. Cl.
CPC .......... *G06F 3/0227* (2013.01); *G06K 7/10544* (2013.01); *G06K 7/10821* (2013.01); *G06K 2207/1017* (2013.01)

(58) Field of Classification Search
USPC ........................................................ 235/375
See application file for complete search history.

(56) References Cited

U.S. PATENT DOCUMENTS

| | | |
|---|---|---|
| 3,996,456 A | 12/1976 | Hoover |
| 5,764,774 A | 6/1998 | Liu |
| 6,123,262 A | 9/2000 | Shellhammer |
| 6,279,828 B1 | 8/2001 | Fann |
| 7,344,080 B2 | 3/2008 | Vinogradov |
| 7,487,914 B2 | 2/2009 | Yoon et al. |
| 7,561,283 B2 | 7/2009 | Kitahara et al. |

(Continued)

FOREIGN PATENT DOCUMENTS

| | | |
|---|---|---|
| CA | 2673217 A1 | 10/2009 |
| DE | 19737393 A1 | 3/1999 |

OTHER PUBLICATIONS

Opticon, Bar Code Configuration and Commands Manual SC5-USB, Opticon, 2006, http://www.opticonusa.com/pdf/Manuals/Universal_Menu_Book.pdf.*

(Continued)

*Primary Examiner* — Michael G Lee
*Assistant Examiner* — David Tardif
(74) *Attorney, Agent, or Firm* — Nong-Qiang Fan

(57) ABSTRACT

A system for, and a method of, configuring an electro-optical reader as a keyboard device having a selected keyboard layout containing keyboard layout data, encode each of a plurality of configuration symbols with a symbol sequence number, a total number of the configuration symbols, and a fractional amount of the keyboard layout data. During a configuration procedure, all the configuration symbols are electro-optically scanned and decoded, and the symbol sequence number, the total number of the configuration symbols, and the fractional amount of the keyboard layout data are extracted for each configuration symbol. The keyboard layout data for all the configuration symbols are linked in a sequence determined by each symbol sequence number and the total number of the configuration symbols. All the keyboard layout data is processed to configure the reader during the configuration procedure.

20 Claims, 7 Drawing Sheets

(56) References Cited

U.S. PATENT DOCUMENTS

| | | |
|---|---|---|
| 8,146,816 B2 | 4/2012 | Kuyper-Hammond et al. |
| 2008/0048044 A1 | 2/2008 | Zhao et al. |
| 2008/0165035 A1* | 7/2008 | Bhella .................. G06F 3/0238 341/23 |
| 2009/0078774 A1 | 3/2009 | He |
| 2011/0063225 A1 | 3/2011 | Michon |
| 2013/0145061 A1* | 6/2013 | Parivar .................. G06F 9/4415 710/67 |

OTHER PUBLICATIONS

International Search Report and Written Opinion mailed Feb. 21, 2014 in counterpart PCT application No. PCT/US2013/070652.

* cited by examiner

FIG. 5

COUNTRY KEYBOARD LAYOUT TABLE

COUNTRY CODE: US

CODE PAGE: WINCP01252

| Key # | ALLUP | SHIFT | _ALT | ALTSH * |
|---|---|---|---|---|
| 1 | ' | ~ | | |
| 2 | 1 | ! | | |
| 3 | 2 | @ | | |
| 4 | 3 | # | | |
| 5 | 4 | $ | | |
| 6 | 5 | % | | |
| 7 | 6 | ^ | | |
| 8 | 7 | & | | |
| 9 | 8 | * | | |
| 10 | 9 | ( | | |
| 11 | 0 | ) | | |
| 12 | - | _ | | |
| 13 | = | + | | |

*FIG. 6*

KEYBOARD LAYOUT

------UCTRY_WIN_LATIN_NORTH_AM(CP WIN_1252)------

SYSTEM FOR, AND METHOD OF, CONFIGURING ELECTRO-OPTICAL READER AS A KEYBOARD DEVICE HAVING A SELECTED KEYBOARD LAYOUT

FIELD OF THE DISCLOSURE

The present disclosure relates generally to processing transactions with an electro-optical reader for electro-optically capturing data from a target, and for sending the captured data to a host for processing, and, more particularly, to a system for, and a method of, configuring the reader as a keyboard device having a selected keyboard layout.

BACKGROUND

Moving laser beam readers or laser scanners, as well as solid-state imaging systems or imaging readers, have both been used, in both handheld and hands-free modes of operation, to electro-optically read targets, such as one- or two-dimensional bar code symbols to be decoded. The bar code symbols have different bar and space patterns that are used to represent different characters, such as alpha-numeric characters on a keyboard. Sets of these patterns are grouped together to form a symbology. There are many types of bar code symbologies, each having their own special characteristics and features. Most symbologies are designed to meet the needs of a specific application or industry.

The known moving laser beam reader generally includes a housing, a window supported by the housing, and a data capture assembly or laser scan engine in the housing for electro-optically capturing data from a target. The data capture assembly includes a laser for emitting a laser beam through the window, a focusing lens assembly for focusing the laser beam to form a beam spot having a certain size at a focal plane in a range of working distances relative to the window, a scan component for repetitively scanning the beam spot across the target in a scan pattern, for example, a scan line, across the target multiple times per second, e.g., forty times per second, a photodetector for detecting return light reflected and/or scattered from the target and for converting the detected light into an analog electrical signal, and signal processing circuitry including a digitizer for digitizing the analog signal, and a microprocessor or controller for decoding the digitized signal based upon a specific symbology used for the target to identify the target, and for transmitting the decoded signal, either via a wireless or wired link, to a remote host for further processing, e.g., price retrieval from a price database to obtain a price for the identified target.

The known imaging reader also generally includes a housing, a window supported by the housing, and a data capture assembly or imaging scan engine in the housing. The data capture assembly includes a solid-state imager (or image sensor) with a sensor array of photocells or light sensors (also known as pixels), and an imaging lens assembly for capturing return light scattered and/or reflected from the target being imaged through the window over an imaging field of view, and for projecting the return light onto the image sensor to initiate capture of an image of the target over a range of working distances in which the target can be read. Such an image sensor may include a one-dimensional charge coupled device (CCD) or a complementary metal oxide semiconductor (CMOS) device and associated circuits for producing and processing electrical signals corresponding to a one-dimensional array of pixel data over the imaging field of view. These electrical signals are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

Each host is typically supported by a keyboard operatively connected to the host, which is typically a server or a computer running an operating system. The keyboard typically includes a typewriter-style arrangement of keys to which letters, numbers, signs, and commands are assigned, and is used for manually entering information for the host. Such information could include system control/command/update information, as well as the decoded data of the target. Sometimes, a target cannot be read by the reader, and it is therefore at such times necessary for a user to manually enter the decoded data by keyboard entry to enable the target to be identified, and the transaction to be completed.

Just as the keyboard is an input device for the host, both types of readers are also input devices for the host, and it is desired that each reader be configured as a keyboard device having a keyboard layout, which is the same as for the keyboard. However, one concern relates to the many different keyboard layouts that exist internationally, and to the multitude of keyboard layout data that exists in each keyboard layout. At present, there are over eighty international keyboard layouts. Each country has at least one, and sometimes, more than one, keyboard layout. Each keyboard layout can contain hundreds of bytes of keyboard layout data.

To configure a reader as a keyboard device having a particular keyboard layout, it is possible to hard-code the keyboard layout into firmware, e.g., an internal microprocessor of the reader. Yet, the requirement for extra memory storage in the microprocessor is an undesirable cost burden, especially in the case where it is required to make the reader as inexpensive and as compact as possible. It is also known to configure a reader by having the reader read a single configuration symbol during a configuration procedure prior to reading the targets. Yet, in the context of making an imaging reader as inexpensive and as compact as possible, it is desirable for the sensor array to be one-dimensional, in which case, the configuration symbol may have to also be one-dimensional. It is possible, for certain specially designed readers, for the configuration symbol to be a PDF417 symbol, but even this symbol is essentially a stacked one-dimensional symbol. However, a single one-dimensional configuration symbol cannot contain all the hundreds of bytes of keyboard layout data in the keyboard layout to be uploaded.

It is still further known to configure a reader by having the reader read a plurality of one-dimensional configuration symbols during the configuration procedure. Yet, this has also not proven to be entirely effective in all cases, because sometimes the user misses one or more of the configuration symbols, thereby causing the keyboard layout to be incomplete.

Accordingly, there is a need to reliably configure a reader, especially a miniaturized, highly compact, and inexpensive reader for electro-optically reading one-dimensional targets, as a keyboard device having a selected keyboard layout.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a graph of the keyboard of FIG. 1 with each key identified by number.

FIG. 6 is a partially broken-away, representative keyboard layout table for some representative keys identified in the graph of FIG. 5.

FIG. 8 is a keyboard layout containing all the keyboard layout data for a representative US keyboard.

Figure 1:
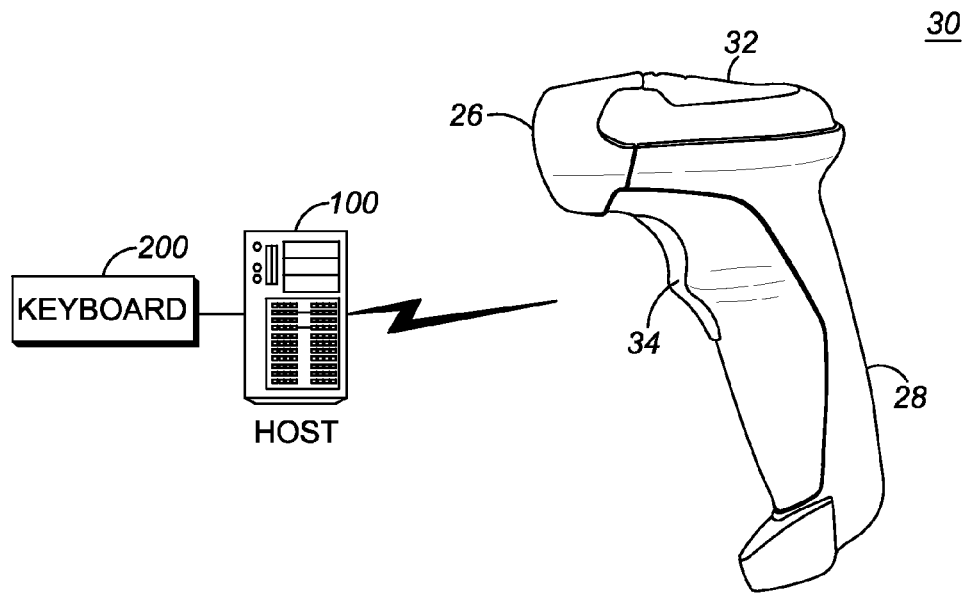
FIG. 1 is a side elevational view of an electro-optical apparatus including a portable handheld reader for electro-optically reading targets, a host for processing data collected by the reader, and a keyboard.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

This disclosure generally relates to an apparatus for processing transactions with an electro-optical reader for electro-optically capturing data from a target, and for sending the captured data to a host for processing. More specifically, one aspect of this disclosure relates to a system for configuring the reader as a keyboard device having a selected keyboard layout containing keyboard layout data. The system includes a plurality of configuration symbols, each encoded with a symbol sequence number, a total number of the configuration symbols, and a fractional amount of the keyboard layout data. The system also includes a data capture assembly in the reader for electro-optically scanning all the configuration symbols during a configuration procedure prior to processing the transactions, and a controller in the reader for decoding all the scanned configuration symbols, and for extracting the symbol sequence number, the total number of the configuration symbols, and the fractional amount of the keyboard layout data for each configuration symbol. The controller is further operative for linking the keyboard layout data for all the configuration symbols in a sequence determined by each symbol sequence number and the total number of the configuration symbols, and for processing all the keyboard layout data to configure the reader during the configuration procedure.

In one embodiment, the data capture assembly includes a laser for emitting a laser beam, a scanner for sweeping the laser beam in a scan line across each configuration symbol for reflection and scattering therefrom, and a detector for detecting return light captured from each configuration symbol. In another embodiment, the data capture assembly includes a solid-state imager having an array of sensors for detecting return light in a virtual scan line captured from each configuration symbol.

Advantageously, the controller is operative for accessing a memory in which all the keyboard layout data is stored, for compressing all the keyboard layout data prior to storage in the memory, and for mapping unsupported characters into a supported character set of the configuration symbols. The configuration symbols are preferably printed on a paper sheet of a manual. The manual preferably has multiple paper sheets. At least one of the paper sheets bears printed configuration symbols containing the keyboard layout data for one type of keyboard, and at least another of the paper sheets bears different printed configuration symbols containing different keyboard layout data for another different type of keyboard. Each configuration symbol is advantageously configured as a Code 128 symbol, but could also be a Universal Product Code (UPC) Version A (UPC-A) symbol, a GS1 DataBar Expanded (Databar-expanded) symbol, or a European Article Numbering (EAN) symbol.

Another aspect of this disclosure relates to a method of configuring the reader as a keyboard device having a selected keyboard layout containing keyboard layout data, by encoding each of a plurality of configuration symbols with a symbol sequence number, a total number of the configuration symbols, and a fractional amount of keyboard layout data, by electro-optically scanning all the configuration symbols during a configuration procedure prior to processing the transactions, by decoding all the scanned configuration symbols, by extracting the symbol sequence number, the total number of the configuration symbols, and the fractional amount of the keyboard layout data for each configuration symbol, by linking the keyboard layout data for all the configuration symbols in a sequence determined by each symbol sequence number and the total number of the configuration symbols, and by processing all the keyboard layout data to configure the reader during the configuration procedure.

Turning now to the drawings, reference numeral 30 in FIG. 1 generally identifies an ergonomic electro-optical reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted relative to the vertical. The reader 30 is held in an operator's hand and used in a handheld mode in which a trigger 34 is manually depressed to initiate reading of targets, especially bar code symbols, in a range of working distances relative to the window 26. Housings of other configurations can also be employed.

Figure 2:
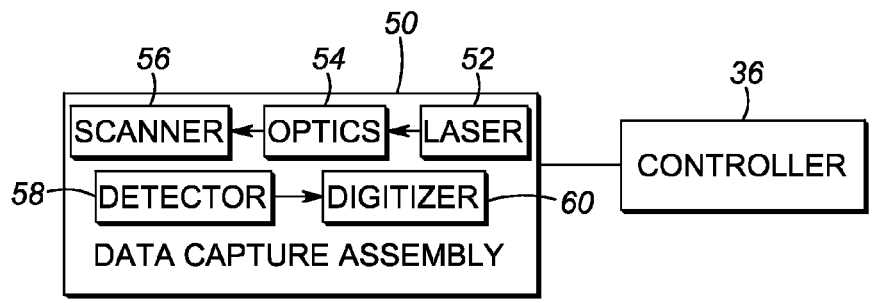
FIG. 2 is a schematic diagram of one embodiment of a data capture assembly for use in the reader of FIG. 1 when the reader is a moving laser beam reader.

In one embodiment, the reader 30 is a moving laser beam reader and, as shown in FIG. 2, a data capture assembly 50 or laser scan engine is mounted in the reader 30 for electro-optically capturing data from a target. The data capture assembly 50 includes a laser 52 for emitting a laser beam through the window 26, a focusing lens assembly or optics 54 for focusing the laser beam to form a beam spot having a certain size at a focal plane in a range of working distances relative to the window 26, a scan component 56 for repetitively scanning the beam spot across the target in a scan pattern, for example, a scan line, across the target multiple times per second, e.g., forty times per second, a photodetector 58 for detecting return light reflected and/or scattered from the target and for converting the detected light into an analog electrical signal, and signal processing circuitry including a digitizer 60 for digitizing the analog signal, and a microprocessor or controller 36 for decoding the digitized signal based upon a specific symbology used for the target to identify the target, and for transmitting the decoded signal, either via a wireless or wired link, to a remote host 100 (see FIG. 1) for further processing, e.g., price retrieval from a price database to obtain a price for the identified target.

Figure 3:
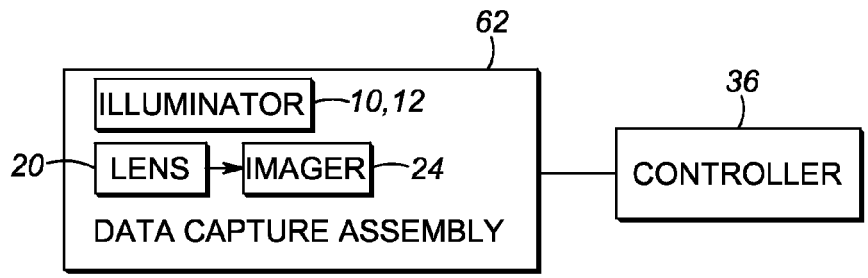
FIG. 3 is a schematic diagram of another embodiment of a data capture assembly for use in the reader of FIG. 1 when the reader is an imaging reader.

In another embodiment, the reader 30 is an imaging reader and, as shown in FIG. 3, a data capture assembly 62 or imaging scan engine is mounted in the reader 30 and includes a solid-state imager 24 (or image sensor) with a sensor array of photocells or light sensors (also known as pixels), an illumination assembly 10, 12 for illuminating the target, and an imaging lens assembly 20 for capturing return illumination light scattered and/or reflected from the target being imaged through the window 26 over an imaging field of view, and for projecting the return light onto the image sensor 24 to initiate capture of an image of the target over a range of working distances in which the target can be read. Such an image sensor 24 may include a one-dimensional charge coupled device (CCD) or a complementary metal oxide semiconductor (CMOS) device and associated circuits for producing and processing electrical signals corresponding to a one-dimensional array of pixel data over the imaging field of view. These electrical signals are decoded and/or processed by a programmed microprocessor or controller 36 into information related to the target being read, e.g., decoded data identifying the target. The controller 36 is operative for transmitting the decoded data, either via a wireless or wired link, to the remote host 100 (see FIG. 1) for further processing, e.g., price retrieval from a price database to obtain a price for the identified target.

Figure 4:
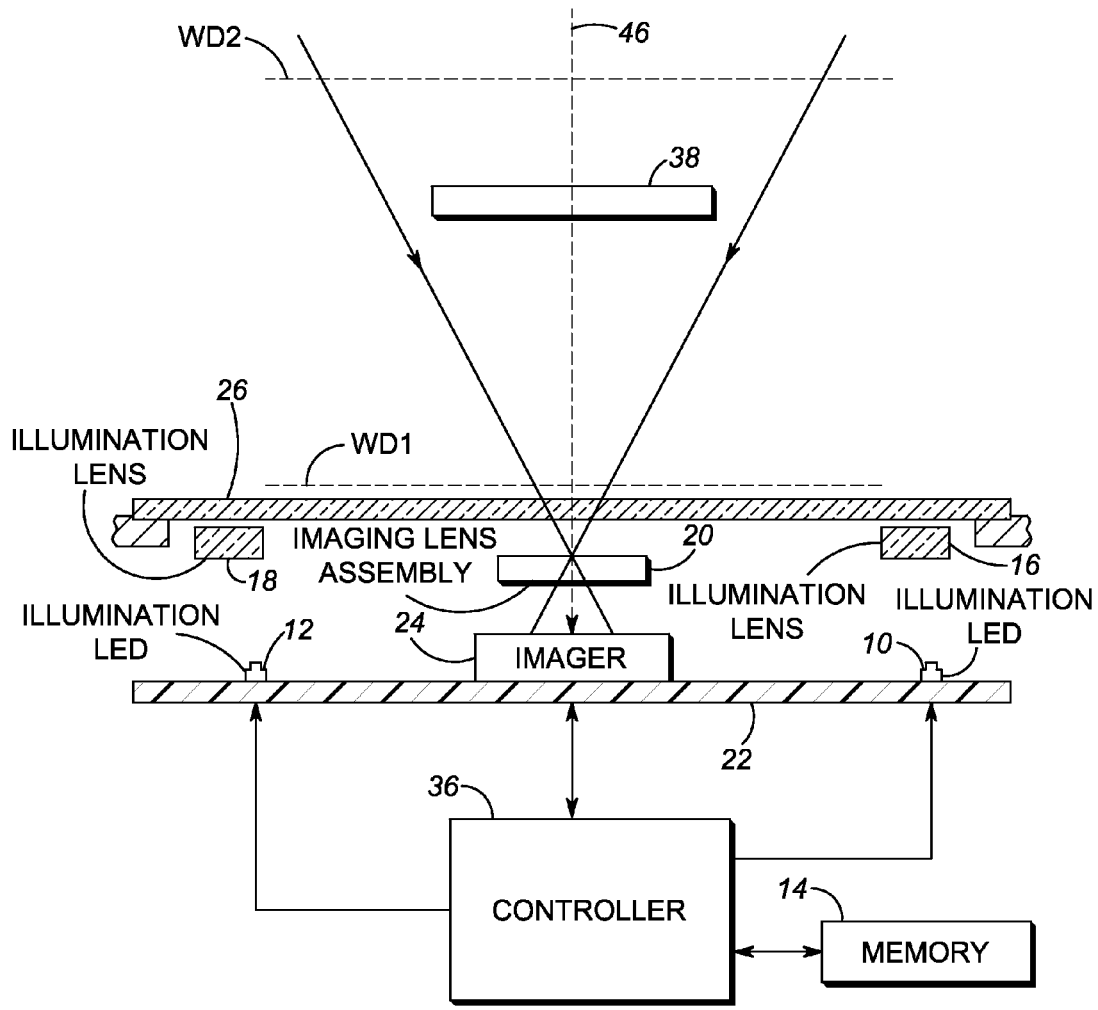
FIG. 4 is a schematic diagram of various components of the data capture assembly of FIG. 3.

As schematically shown on an enlarged scale in FIG. 4, the imager 24 is mounted on a printed circuit board (PCB) 22 in the reader 30. The PCB 22 is preferably mounted within the tilted handle 28. The illuminating light assembly includes an illumination light source, e.g., at least one light emitting diode (LED), and preferably a plurality of LEDs, such as a pair of LEDs 10, 12, and a pair of lenses 16, 18 configured to generate a substantially uniform distributed illumination pattern of light on, and along, a target 38 to be read by image capture. At least part of the scattered and/or reflected return light is derived from the illumination pattern of light on and along the target 38. The one-dimensional, solid-state imager 24 detects the return illumination light captured by the imaging lens assembly 20 along an imaging axis 46 through the window 26. The return light is scattered and/or reflected from the target 38 over the field of view. The field of view is generally perpendicular to the imaging axis 46. The target 38 may be located anywhere in a working range of distances between a close-in working distance (WD1) and a far-out working distance (WD2). In a preferred embodiment, WD1 is about one-half inch from the window 26, and WD2 is about thirty inches from the window 26.

As also shown in FIG. 4, the imager 24 and the LEDs 10, 12 are operatively connected to a controller or microprocessor 36 operative for controlling the operation of these components. A memory 14 is connected and accessible to the controller 36. Although the memory 14 is shown externally of the controller 36, it is preferred if the memory is internal to the controller 36. Preferably, the microprocessor 36 is the same as the one used for processing the return light from the target 38.

In operation, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target 38 only during said exposure time period. A typical array needs about 11-33 milliseconds to acquire the entire target image and operates at a frame rate of about 30-90 frames per second.

As previously described, the host 100 is supported by a keyboard 200 (see FIG. 1) operatively connected to the host 100, which is typically a server or a computer running an operating system. The keyboard 200 typically includes a typewriter-style arrangement of keys to which letters, numbers, signs, and commands are assigned, and is used for manually entering information for the host 100. Such information could include system control/command/update information, as well as the decoded data of the target 38. Sometimes, a target 38 cannot be read by the reader 30, and it is therefore at such times necessary for a user to manually enter the decoded data by keyboard entry to enable the target 38 to be identified, and the transaction to be completed.

Just as the keyboard 200 is an input device for the host 100, each reader 30 is also an input device for the host 100, and it is desired that each reader 30 be configured as a keyboard device having a keyboard layout, which is the same as for the keyboard 200. However, as described above, it is difficult to configure a reader with a particular keyboard layout, since there are over eighty different keyboard layouts that exist internationally, and there is a multitude of keyboard layout data that exists for each keyboard layout. As noted above, hard-coding a keyboard layout into firmware, e.g., the internal memory 14 of the microprocessor 36, is an undesirable cost burden. Having the reader 30 read a single one-dimensional configuration symbol that cannot contain all the hundreds of bytes of keyboard layout data in each keyboard layout is an ineffective solution. Having the reader 30 read a plurality of one-dimensional configuration symbols has also not proven to be entirely effective in all cases, because sometimes the user misses one or more of the configuration symbols, thereby causing the keyboard layout for that keyboard to be incomplete.

Figure 5:
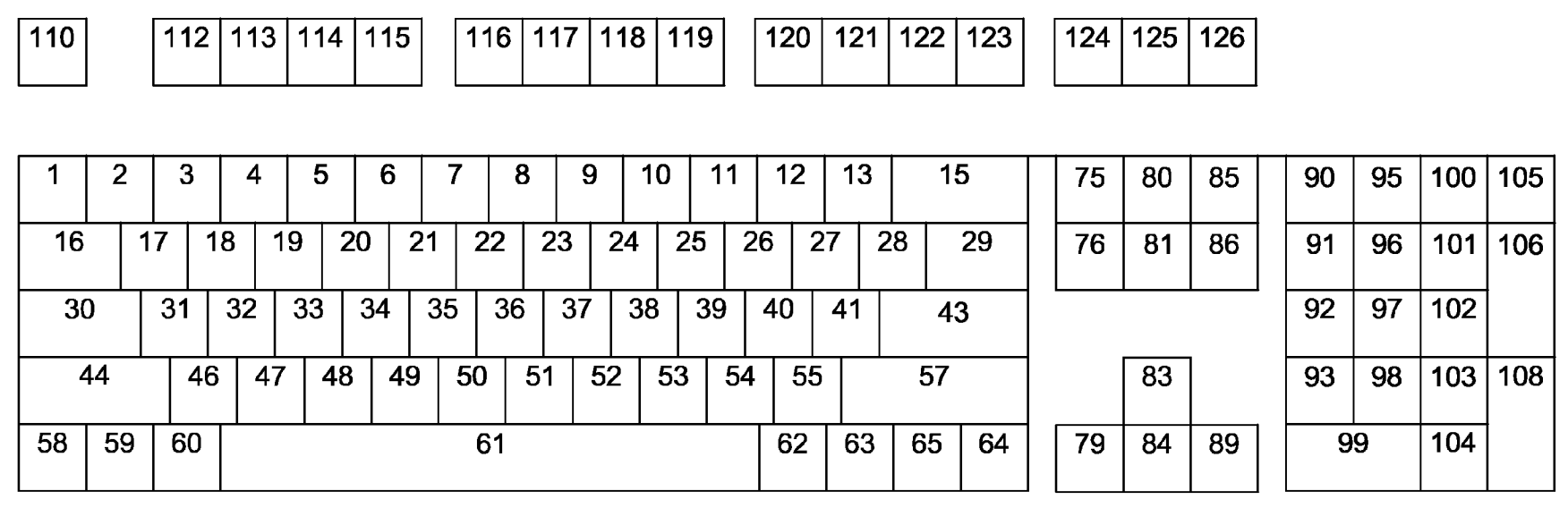

FIG. 5 is a graph of the keyboard 200 of FIG. 1 with each key identified by number. FIG. 6 is a representative keyboard layout table for some representative keys 1-13 identified in the graph of FIG. 5. In accordance with one aspect of this invention, the reader 30 is configured as a keyboard device having the same keyboard layout as shown for the representative keyboard layout table of FIG. 6.

Figure 7:
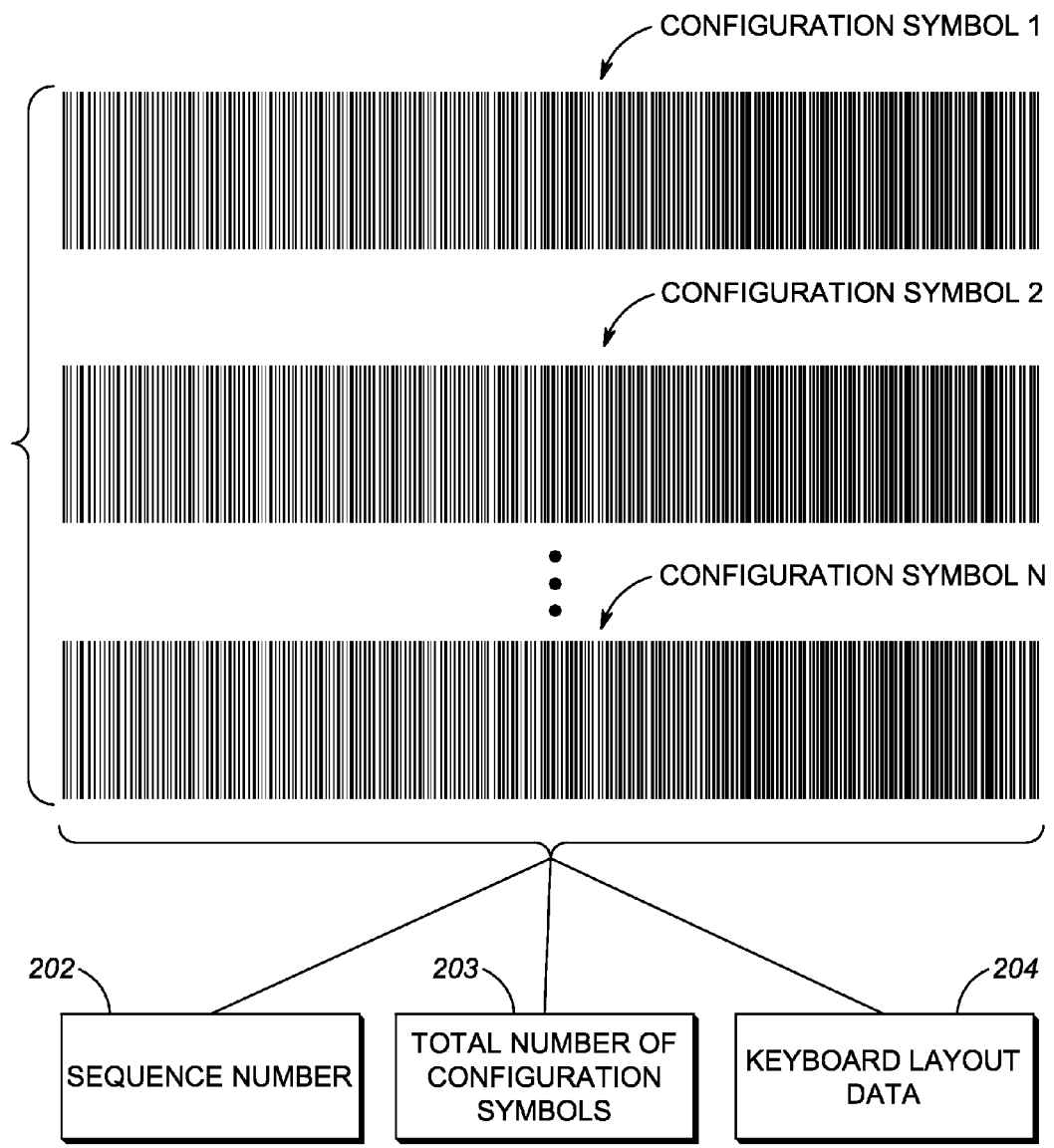
FIG. 7 is a set of configuration symbols used to configure the reader of FIG. 1 as a keyboard device having the same keyboard layout as shown in FIG. 6, each configuration symbol being encoded with a sequence number, a total number of the configuration symbols, and a fractional amount of keyboard layout data.

To that end, a plurality of configuration symbols 1, 2, . . . , N, as shown in FIG. 7, are provided, preferably by being printed on one or more pages of a manual that accompanies the reader 30. The manual can contain different sets of the configuration symbols, each set for a particular country or region. In FIG. 7, each configuration symbol is advantageously configured as a Code 128 symbol, but could also be a Universal Product Code (UPC) Version A (UPC-A) symbol, a GS1 DataBar Expanded (Databar-expanded) symbol, or a European Article Numbering (EAN) symbol. By way of example, a total number (N) of thirteen configuration symbols are typically provided to layout a North American, U.S.-style keyboard.

Figure 8:
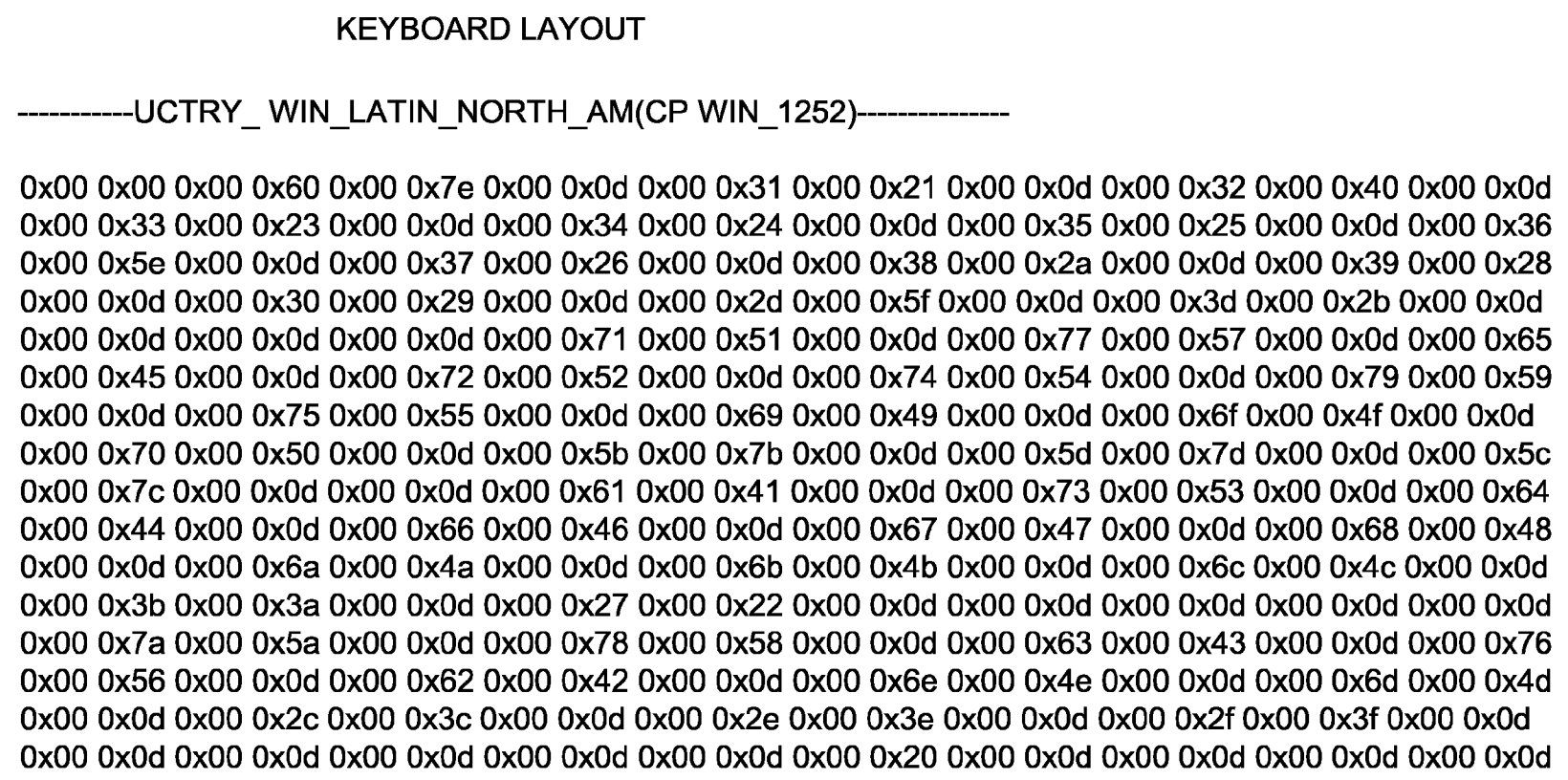

Each configuration symbol is encoded with a symbol sequence number 202, i.e., the number 1, 2, . . . N of the configuration symbol, and with the total number N of configuration symbols 203. Each configuration symbol is also encoded with a certain or fractional amount of keyboard layout data 204. FIG. 8 depicts all the keyboard data for a keyboard layout, in this case, a North American, U.S.-style keyboard.

Figure 9:
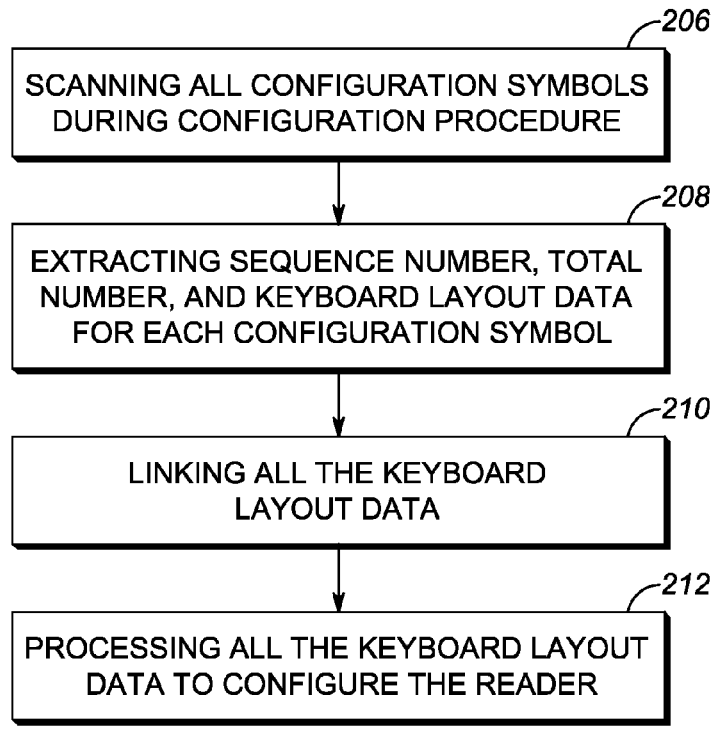
FIG. 9 is a flow chart depicting steps in performing a method in accordance with the present disclosure.

Referring to the flow chart of FIG. 9, during a configuration procedure prior to processing the transactions, the data capture assembly 50, 62 in each reader 30 electro-optically scans all the configuration symbols (step 206). The controller 36 decodes all the scanned configuration symbols and extracts the symbol sequence number 202, the total number of the configuration symbols 203, and the fractional amount of keyboard layout data 204 for each configuration symbol (step 208). The controller 36 also links the keyboard layout data 204 for all the configuration symbols in a sequence determined by each symbol sequence number 202 (step 210) and the total number of the configuration symbols 203, and processes all the keyboard layout data 204 (step 212) into a keyboard layout (analogous to that shown in FIG. 6) to configure the reader 30 during the configuration procedure. The controller 36 can access the memory 14 in which all the keyboard layout data 204 is stored. The controller 36 can compress all the keyboard layout data 204 prior to storage in the memory 14. The controller 36 can alert a user when at least one of the configuration symbols has not been scanned, and prompt the user to scan any configuration symbol not yet scanned.

As previously mentioned, it is desirable for the reader 30 to be as inexpensive and as compact as possible. Hence, the image sensor 24, for example, is advantageously one-dimensional. In this case, each configuration symbol may also be one-dimensional. However, a single one-dimensional configuration symbol cannot contain all the hundreds of bytes of keyboard layout data 204 in the keyboard layout of FIG. 8. That is why a plurality of configuration symbols are used, as well as why the sequence number 202 and the total number of the configuration symbols 203 are used to insure data integrity, e.g., that no configuration symbol is missed, or that no single configuration symbol is read more than once.

Figure 10:
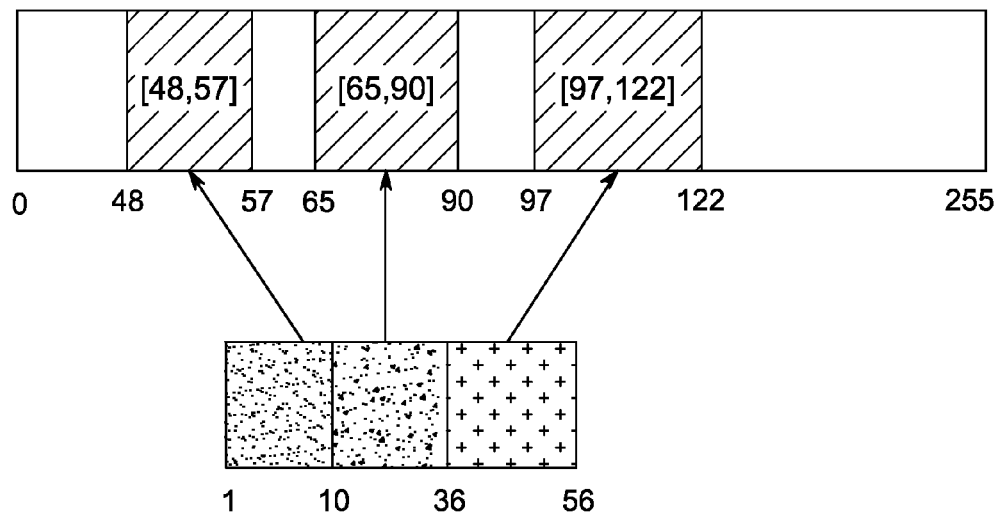
FIG. 10 is a graph depicting mapping of unsupported characters during the customization of the keyboard of FIG. 1.

Instead of using the Code 128 symbology to encode the configuration symbols, it is advantageous to employ Databar-expanded because that symbology has shorter symbols. However, as shown in FIG. 10, Databar-expanded only supports character sets from 48 to 57, 65 to 90, and 97 to 122, plus a few special characters. Unsupported keyboard layout data can, however, be divided into three groups, e.g., 1-10, 11-36, and 37-56, and each of these groups can be translated to regions of the Databar-expanded symbol that are supported.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. In an apparatus for processing transactions with an electro-optical reader for electro-optically capturing data from a target, and for sending the captured data to a host for processing, a system for configuring the reader as a keyboard device having a selected keyboard layout containing keyboard layout data, the system comprising:

symbol sequence number, a total number of the one—a plurality of one-dimensional bar codes, each encoded with a dimensional bar codes, and a fractional amount of the keyboard layout data;

a data capture assembly in the reader for electro-optically scanning all the one-dimensional bar codes during a configuration procedure prior to processing the transactions; and a controller in the reader for decoding all the scanned one-dimensional bar codes, for extracting the symbol sequence number, the total number of the one-dimensional bar codes, and the fractional amount of the keyboard layout data for each configuration symbol, for linking the keyboard layout data for all the one-dimensional bar codes in a sequence determined by each symbol sequence number and the total number of the one-dimensional bar codes, and for processing all the keyboard layout data to configure the reader during the configuration procedure.

2. The system of claim 1, wherein the data capture assembly includes a laser for emitting a laser beam, a scanner for sweeping the laser beam in a scan line across each configuration symbol for reflection and scattering therefrom, and a detector for detecting return light captured from each configuration symbol.

3. The system of claim 1, wherein the data capture assembly includes a solid-state imager having an array of sensors for detecting return light in a virtual scan line captured from each configuration symbol.

4. The system of claim 1, wherein the controller is operative for accessing a memory in which all the keyboard layout data is stored.

5. The system of claim 4, wherein the controller is operative for compressing all the keyboard layout data prior to storage in the memory.

6. The system of claim 1, wherein the plurality of one-dimensional bar codes are printed on a paper sheet of a manual.

7. The system of claim 6, wherein the manual has multiple paper sheets, at least one of the paper sheets bearing printed one-dimensional bar codes containing the keyboard layout data for one type of keyboard, and at least another of the paper sheets bearing different printed one-dimensional bar codes containing different keyboard layout data for another different type of keyboard.

8. The system of claim 1, wherein the controller is operative for alerting a user when at least one of the one-dimensional bar codes has not been scanned.

9. The system of claim 1, wherein the controller is operative for mapping unsupported characters into a supported character set of the one-dimensional bar codes.

10. The system of claim 1, wherein each configuration symbol is one of a Universal Product Code (UPC) Version A (UPC-A) symbol, a GS1 DataBar Expanded (Databar-expanded) symbol, a Code 128 symbol, and a European Article Numbering (EAN) symbol.

11. In a method of processing transactions by electro-optically capturing data from a target with an electro-optical reader operative for sending the captured data to a host for processing, a method of configuring the reader as a keyboard device having a selected keyboard layout containing keyboard layout data, the configuring method comprising:

encoding each of a plurality of one-dimensional bar codes with a symbol sequence number, a total number of the one-dimensional bar codes, and a fractional amount of the keyboard layout data;

electro-optically scanning all the one-dimensional bar codes during a configuration procedure prior to processing the transactions;

decoding all the scanned one-dimensional bar codes and extracting the symbol sequence number, the total number of the one-dimensional bar codes, and the fractional amount of the keyboard layout data for each configuration symbol;

linking the keyboard layout data for all the one-dimensional bar codes in a sequence determined by each symbol sequence number and the total number of the one-dimensional bar codes; and processing all the keyboard layout data to configure the reader during the configuration procedure.

12. The method of claim 11, wherein the scanning is performed by emitting a laser beam from the reader, sweeping the laser beam in a scan line across each configuration symbol for reflection and scattering therefrom, and detecting return light captured from each configuration symbol.

13. The method of claim 11, wherein the scanning is performed by detecting return light captured from each configuration symbol in a virtual scan line with an array of sensors of a solid-state imager.

14. The method of claim 11, wherein the scanning is performed by storing all the keyboard layout data in a memory.

15. The method of claim 14, and compressing all the keyboard layout data prior to storage in the memory.

16. The method of claim 11, and printing the plurality of one-dimensional bar codes on a paper sheet of a manual.

17. The method of claim 11, and printing different pluralities of one-dimensional bar codes on different paper sheets of a manual, at least one of the paper sheets bearing printed one-dimensional bar codes containing the keyboard layout data for one type of keyboard, and at least another of the paper sheets bearing different printed one-dimensional bar codes containing different keyboard layout data for another different type of keyboard.

18. The method of claim 11, and alerting a user when at least one of the one-dimensional bar codes has not been scanned.

19. The method of claim 11, and mapping unsupported characters into a supported character set of the one-dimensional bar codes.

20. The method of claim 11, and configuring each configuration symbol as one of a Universal Product Code (UPC) Version A (UPC-A) symbol, a GS1 DataBar Expanded (Databar-expanded) symbol, a Code 128 symbol, and a European Article Numbering (EAN) symbol.

* * * * *